(12) United States Patent
Chang

(10) Patent No.: US 11,262,843 B1
(45) Date of Patent: Mar. 1, 2022

(54) PAIR OF KEYBOARD/MOUSE GLOVES AND CONTROL METHOD THEREOF

(71) Applicant: Xu Chang, Guangdong (CN)

(72) Inventor: Xu Chang, Guangdong (CN)

( * ) Notice: Subject to any disclaimer, the term of this patent is extended or adjusted under 35 U.S.C. 154(b) by 0 days.

(21) Appl. No.: 17/391,013

(22) Filed: Aug. 1, 2021

Related U.S. Application Data

(63) Continuation-in-part of application No. PCT/CN2020/107164, filed on Aug. 5, 2020.

(51) Int. Cl.
- *G06F 3/01* (2006.01)
- *G06F 3/02* (2006.01)
- *G06F 3/0354* (2013.01)
- *G06F 3/038* (2013.01)

(52) U.S. Cl.
CPC .............. *G06F 3/014* (2013.01); *G06F 3/021* (2013.01); *G06F 3/0219* (2013.01); *G06F 3/0383* (2013.01); *G06F 3/03543* (2013.01); *G06F 2203/0382* (2013.01)

(58) Field of Classification Search
CPC .............................................. G06F 2203/0382
USPC ......................................................... 345/156
See application file for complete search history.

(56) References Cited

U.S. PATENT DOCUMENTS

| 5,571,020 A * | 11/1996 | Troudet | G09B 5/065 |
| | | | 2/160 |
| 10,918,289 B1 * | 2/2021 | Wasson | A61B 5/6826 |
| 2016/0134299 A1 * | 5/2016 | Lowe | G06F 3/016 |
| | | | 341/15 |
| 2016/0313798 A1 * | 10/2016 | Connor | A61B 5/0059 |

FOREIGN PATENT DOCUMENTS

| GN | 206711025 U | 12/2017 |
| GN | 109960408 A | 7/2019 |

* cited by examiner

*Primary Examiner* — Mark Edwards

(57) ABSTRACT

The present disclosure relates to a pair of keyboard/mouse gloves and a control method thereof, where the pair of keyboard/mouse gloves include a left-handed keyboard/mouse glove and a right-handed keyboard/mouse glove that are matched for use and have a same structure, a glove body, a control chip, a plurality of sensor groups, and a display. The sensor group is disposed inside the glove body and respectively sleeved on each finger, and the sensor groups are connected to the control chip after being connected to each other through a data communication line. The control chip receives a single signal or a signal combo from each sensor group for key position analysis, and transmits a key position analysis result to the display for display.

10 Claims, 4 Drawing Sheets

PAIR OF KEYBOARD/MOUSE GLOVES AND CONTROL METHOD THEREOF

CROSS REFERENCE TO RELATED APPLICATIONS

The present application is a Continuation-In-Part Application of PCT Application No. PCT/CN2020/107164 filed on Aug. 5, 2020, the contents of which are incorporated herein by reference in their entirety.

TECHNICAL FIELD

The present disclosure relates to the field of keyboard/mouse glove technologies, and in particular, to a pair of keyboard/mouse gloves and a control method thereof.

BACKGROUND

There are about 1.5 billion computer users in the world, and most of them use computers for more than 5 hours every day. After working with computers for a long time with a same posture or improper sitting posture, our necks, backs, eyes, hands, or wrists will suffer severe functional injuries or even obesity, lumbar disc herniation, neurasthenia, and a hemorrhoid, thereby reducing the longevity and quality of life.

Therefore, it is an urgent need to have a new, comfortable and healthy computer input manner. Chinese patent CN201720572773.6 provides a single-handed glove with only a few function keys such as an enter key and a space bar. The glove has limited functions, bad operational flexibility, and poor practicability.

SUMMARY

An objective of the present disclosure is to provide a pair of keyboard/mouse gloves, to provide more functions and complete key position coverage and improve the operational flexibility and practicality; another objective of the present disclosure is to provide a control method of the pair of keyboard/mouse gloves that implements flexible operations through a single signal or a signal combo outputted by a plurality of sensors.

A technical solution of the present disclosure is to provide a pair of keyboard/mouse gloves, where the pair of keyboard/mouse gloves include a left-handed keyboard/mouse glove and a right-handed keyboard/mouse glove that are matched for use and have a same structure, a glove body, a control chip, a plurality of sensor groups, and a display;

the sensor group includes a pressure sensor and at least two displacement sensor groups, where the sensor group is disposed inside the glove body and located at each finger, the pressure sensor is disposed at a fingertip of each finger, the displacement sensor group is disposed at a joint of each finger, the pressure sensor and the displacement sensor group, two displacement sensor groups, and two adjacent sensor groups are respectively connected to each other through a data communication line, and the plurality of sensor groups are connected to the control chip after being connected to each other;

the displacement sensor group includes an arch-shaped elastic ring, a silicone ring, and four displacement sensors, where the four displacement sensors are equidistantly, circumferentially and evenly distributed on an outer wall of the arch-shaped elastic ring, two adjacent displacement sensors are connected to each other through the data communication line, and after the displacement sensors are mounted on the outer wall of the arch-shaped elastic ring, the silicone ring is sleeved on the outer wall of the arch-shaped elastic ring; and both the control chip and the display are mounted at a palm back of the glove body, and the control chip receives a signal sent by the sensor group for key position analysis, and transmits analyzed key position information to the display for display.

Preferably, a sensor group sleeved on a thumb includes a pressure sensor disposed at a fingertip, a second displacement sensor group sleeved on an interphalangeal joint, and a first displacement sensor group sleeved on a metacarpophalangeal joint.

A sensor group sleeved on a remaining finger includes a pressure sensor disposed at a fingertip, a third displacement sensor group sleeved on a distal interphalangeal joint (DIPJ), a second displacement sensor group sleeved on a proximal interphalangeal joint (PIPJ), and a first displacement sensor group sleeved on a metacarpophalangeal joint.

The sensor group outputs a press-and-hold signal of the pressure sensor and displacement signals of a first displacement sensor, a second displacement sensor, and a third displacement sensor to the control chip, and the control chip analyzes the signals and then transmits outputted key position information to the display for display.

Preferably, a plurality of air holes are uniformly disposed on the glove body, a detachable sheet body is disposed at a palm center of the glove body, and a detachable finger sleeve is disposed at a fingertip of the glove body.

Another solution of the present disclosure is to provide a control method of a pair of keyboard/mouse gloves, including the following steps:

(1) dividing key positions of a keyboard with a 104-key layout and a mouse into a first key position area, a second key position area, a third key position area, a fourth key position area, and a fifth key position area;

(2) presetting a signal sent by a sensor group of the pair of keyboard/mouse gloves, and setting a single signal or a signal combo outputted by the sensor group respectively in a one-to-one correspondence with key positions in each key position area;

(3) presetting an action of start or stop of the pair of keyboard/mouse gloves and an action of switching to a key position area;

(4) performing a plurality of actions according to the preset action of start or stop of the pair of keyboard/mouse gloves and the preset action of switching to the key position area when a user wears the pair of keyboard/mouse gloves;

(5) analyzing, by a control chip, the action of start or stop and the action of switching performed by the user, and storing and recording an optimal action habit of start or stop and switching;

(6) performing, by the user, an action according to the preset action of switching to the key position area, transmitting, by the sensor group, a signal to the control chip through a data line, transmitting, by the control chip, the signal to a display through the data line, and displaying, by the display, a key position area in which a current response is made; and (7) performing, by the user, an action according to a preset action corresponding to a key position, transmitting, by the sensor group, a signal to the control chip through the data line, transmitting, by the control chip, the signal to the display through the data line, and displaying, by the display, a currently outputted key position.

Preferably, the first key position area in step (1) includes F1 to F12 keys, a Delete key, a Ctrl key, a Shift key, an Alt key, a Win key, a Tab key, and an ESC key.

The second key position area includes twenty-six letter keys, a comma key, a period key, and a semicolon key.

The third key position area includes 0 to 9 number keys that are located above the letter keys and have symbol superscripts, symbol keys, bracket keys, and slash keys.

The fourth key position area includes direction keys and function keys located above the direction keys.

The fifth key position area includes a left key, a right key and a wheel of the mouse.

Preferably, if fingers in the second key position area and the third key position area are maintained for less than 1s according to a preset action, it indicates that a lowercase letter, a subscript number, or a subscript symbol is input.

If the fingers are maintained for more than 1 s according to the preset action, it indicates that a capital letter or a superscript symbol is input.

Preferably, a preset action of start of the pair of keyboard/mouse gloves is an action of bending other eight fingers except thumbs of both hands and striking a plane.

A preset action of stop of the pair of keyboard/mouse gloves is an action of folding and flatly laying ten fingers of both hands.

An action of switching to the first key position area is striking a left-hand middle finger.

An action of switching to the second key position area is striking a left-hand index finger.

An action of switching to the third key position area is striking the left-hand index finger twice within 1s.

An action of switching to the fourth key position area is striking a right-hand middle finger.

An action of switching to the fifth key position area is sliding of four fingers except the thumb of the left hand.

Preferably, the optimal action habit of start or stop and switching in step (5) includes: summarizing, by the control chip according to a plurality of actions of start or stop and switching performed by the current user, a habitual action of start or stop and switching performed by the user, and defining the habitual action as the optimal action habit of start or stop and switching.

Preferably, the control chip of the pair of keyboard/mouse gloves receives the signal outputted by the sensor group, and if it is detected that a single character is inputted for a plurality of times or for a long time, the control chip transmits the signal to the display through the data line, and the display displays an input error warning.

Preferably, the user performs custom settings on the action of start or stop of the pair of keyboard/mouse gloves, the action of switching to the key area, an input to the key position, and a combination key according to operating habits of the user.

Compared with the prior art, beneficial effects of the present disclosure are as follows:

1) In the present disclosure, a plurality of sensor groups are disposed at joints of fingers and positions between the joints of the fingers, and the sensor converts outputs of various actions of both hands of a user into signals, and outputs a single signal or a signal combo to the control module, thereby achieving the input flexibility of the pair of keyboard/mouse gloves and the function comprehensiveness.

2) With the pair of keyboard/mouse gloves in the present disclosure, both key positions of the keyboard with the conventional 104-key layout and key positions of the mouse are in a one-to-one correspondence with the signals of the sensors, and functions of the keyboard and the mouse can be implemented by the pair of keyboard/mouse gloves, so that a user can break limitations and perform an operation in a comfortable posture.

3) The glove bodies of the pair of keyboard/mouse gloves in the present disclosure are designed according to an environment, air holes are disposed on the glove body, and to adapt to a crowd with excessive hand perspiration, a detachable sheet body is disposed at the palm center of the glove body; and to conveniently perform fingerprint verification when people wear the gloves, a detachable finger sleeve is optionally disposed at a fingertip of the glove body.

LIST OF MAIN REFERENCE NUMERALS

Figure 1:
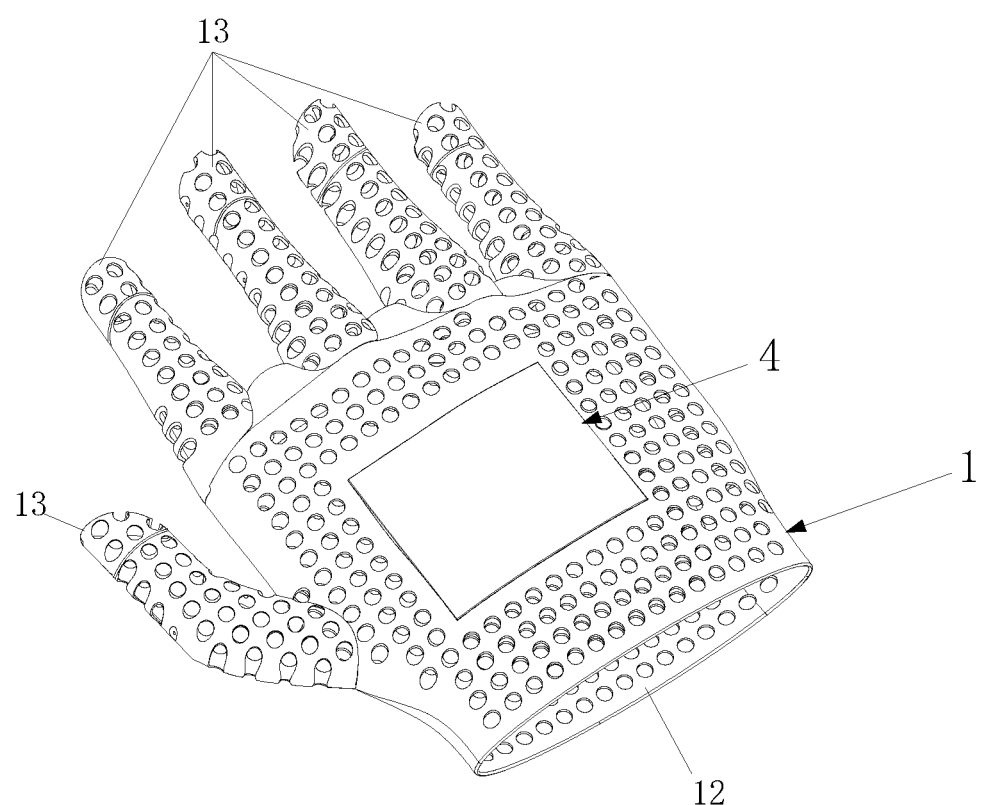
FIG. 1 is an overall schematic structural diagram of a pair of keyboard/mouse gloves.
Figure 2:
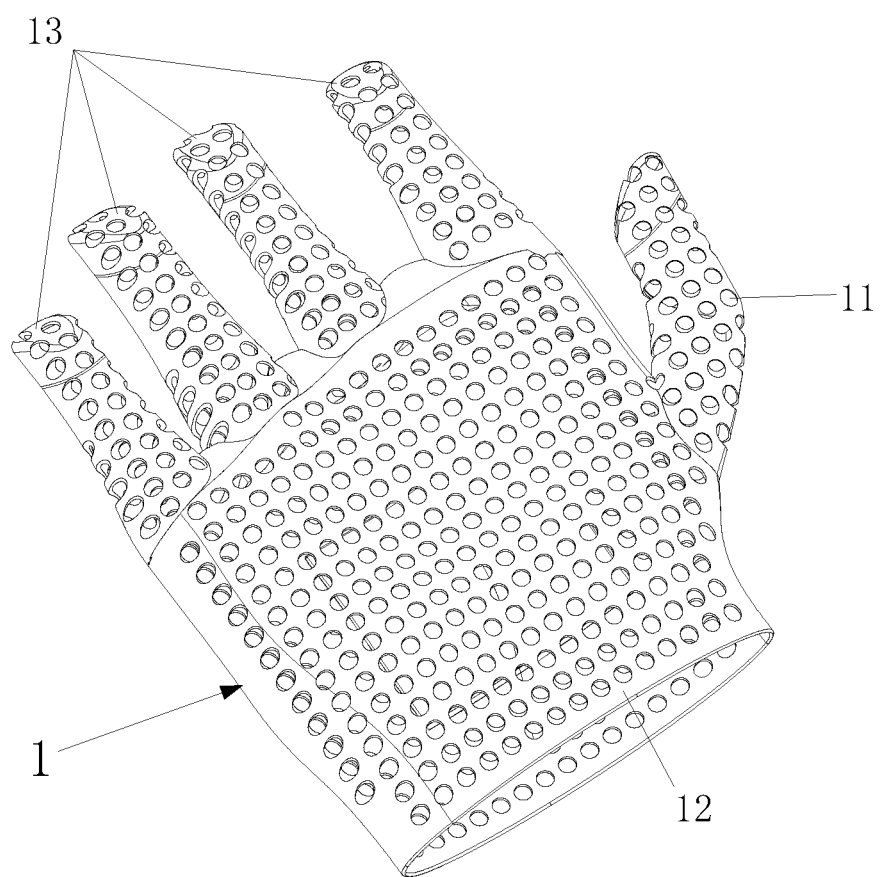
FIG. 2 is an overall schematic structural diagram of a pair of keyboard/mouse gloves in another direction.

1-glove body; 11-air hole; 12-detachable sheet body; 13-finger sleeve; 2-control chip; 3-sensor group; 31-pressure sensor; 32-displacement sensor group; 321-arch-shaped elastic ring; 322-silicone ring; 323-displacement sensor; and 4-display.

DETAILED DESCRIPTION

The following further describes the present disclosure with reference to the accompanying drawings.

The following describes preferred embodiments of the present disclosure in detail with reference to the accompanying drawings, so that the advantages and features of the present disclosure can be more easily understood by a person skilled in the art, thereby defining the protection scope of the present disclosure more clearly and explicitly. The directional terms mentioned in the present disclosure, for example, "upper", "lower", "before", "after", "left", "right" "top" and "bottom", merely refer to directions in the accompanying drawings. Therefore, the directional terms used are intended to describe and understand the present disclosure, but are not intended to limit the present disclosure.

Referring to FIG. 1, FIG. 2, FIG. 3, and FIG. 6, a pair of keyboard/mouse gloves is provided, which includes a left-handed keyboard/mouse glove and a right-handed keyboard/mouse glove that are matched for use and have a same structure, a glove body 1, a control chip 2, a plurality of sensor groups 3, and a display 4. A plurality of air holes 11 are uniformly disposed on the glove body 1, a detachable sheet body 12 is disposed at a palm center of the glove body 1, a detachable finger sleeve 13 is disposed at a fingertip of the glove body 1, and the finger sleeve 13 is connected to the glove body 1 through a data communication line; and both the control chip 2 and the display 4 are mounted at a palm back of the glove body 1, and the control chip 2 receives a signal sent by the sensor group 3 for key position analysis, and transmits analyzed key position information to the display 4 for display.

Figure 3:
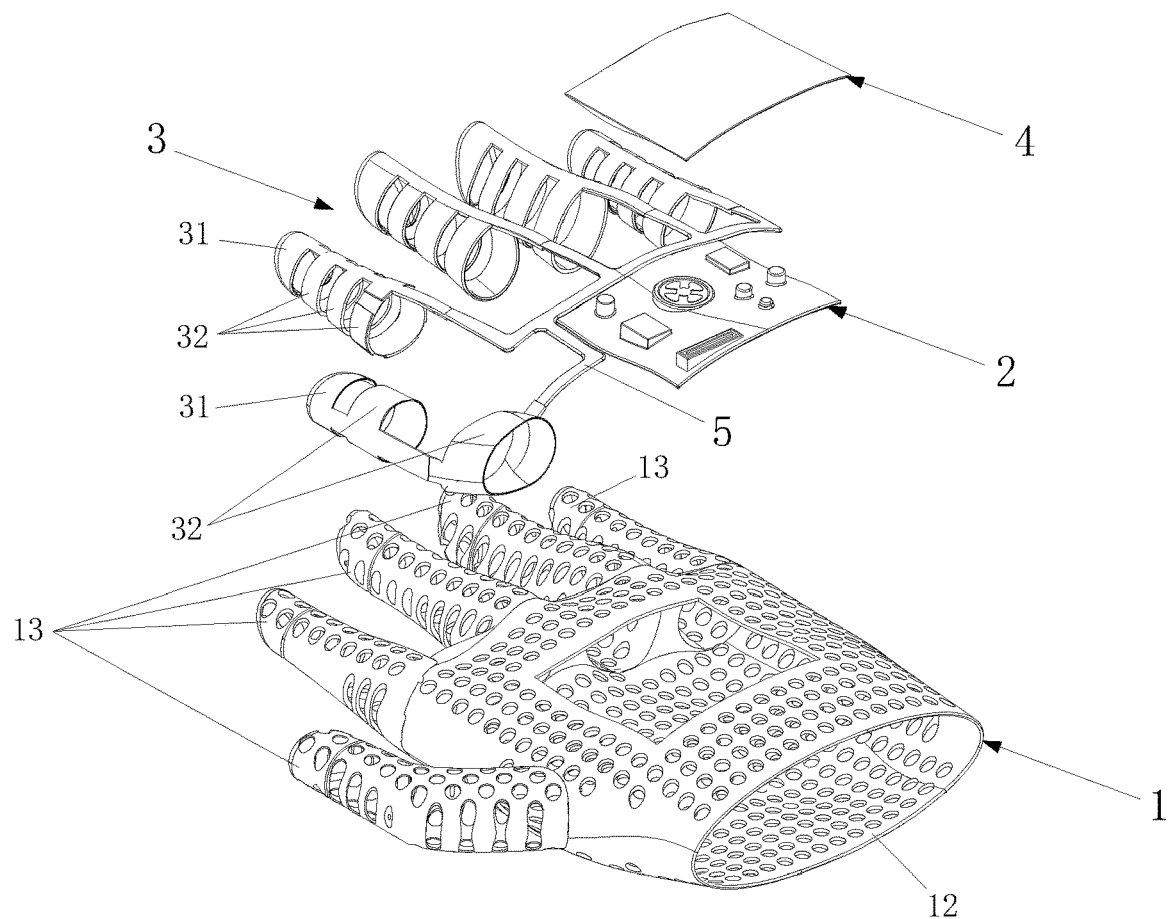
FIG. 3 is a schematic structural expanded view of a pair of keyboard/mouse gloves.
Figure 4:
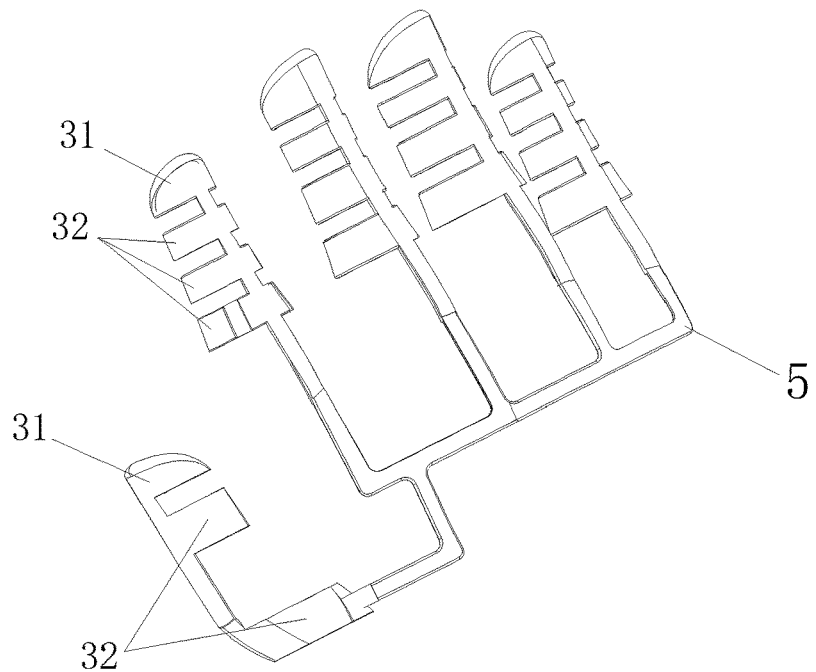
FIG. 4 is a schematic structural diagram of a sensor group of a pair of keyboard/mouse gloves.

Referring to FIG. 3 and FIG. 4, the sensor group 3 is disposed inside the glove body and includes a pressure sensor 31 and displacement sensor groups 32, the pressure sensor 31, the displacement sensor group 32, two displacement sensor groups 32, and two adjacent sensor groups 3 are connected to each other through the data communication line 5, and the plurality of sensor groups are connected to the control chip after being connected to each other.

Figure 5:
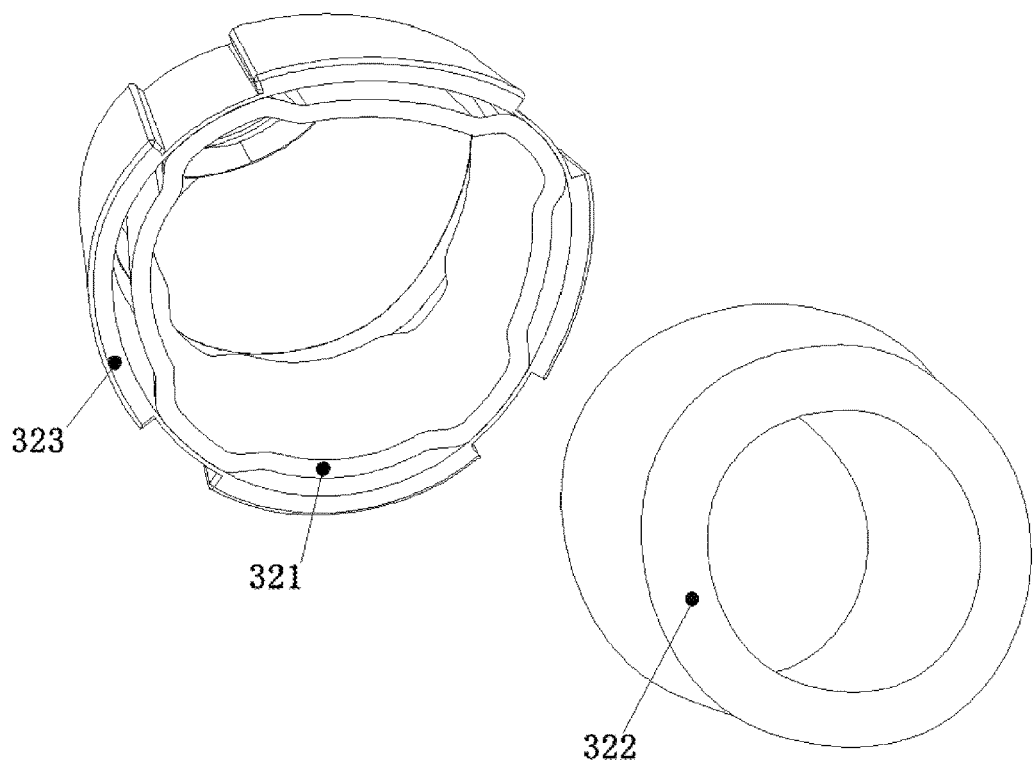
FIG. 5 is a schematic structural diagram of a displacement sensor group of a pair of keyboard/mouse gloves.
Figure 6:
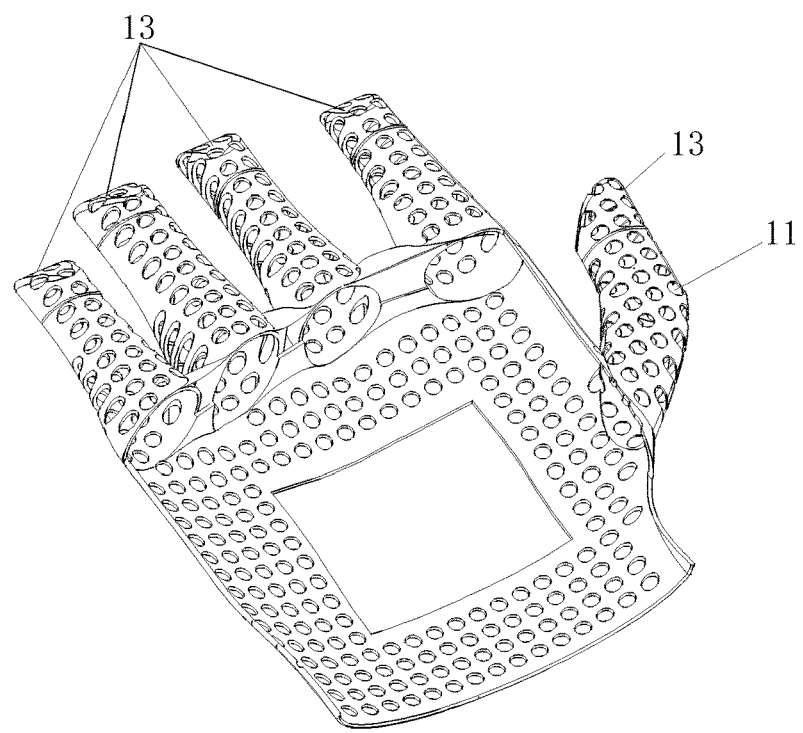
FIG. 6 is a schematic structural diagram of a glove body of a pair of keyboard/mouse gloves (with no detachable sheet body in a palm).

Referring to FIG. 5, the displacement sensor group 32 includes an arch-shaped elastic ring 321, a silicone ring 322, and four displacement sensors 323, where the four displacement sensors 323 are equidistantly, circumferentially and evenly distributed on an outer wall of the arch-shaped elastic ring 321, two adjacent displacement sensors 323 are connected to each other through the data communication line (not shown), and after the displacement sensors 323 are mounted on the outer wall of the arch-shaped elastic ring 321, the silicone ring 322 is sleeved on the outer wall of the arch-shaped elastic ring 321.

Referring to FIG. 4, a sensor group 3 sleeved on a thumb includes a pressure sensor 31 disposed at a fingertip, a second displacement sensor group 32 sleeved on an interphalangeal joint, and a first displacement sensor group 32 sleeved on a metacarpophalangeal joint.

A sensor group 3 sleeved on a remaining finger includes a pressure sensor 31 disposed at a fingertip, a third displacement sensor group 32 sleeved on a distal interphalangeal joint (DIPJ), a second displacement sensor group 32 sleeved on a proximal interphalangeal joint (PIPJ), and a first displacement sensor group 32 sleeved on a metacarpophalangeal joint.

The sensor group 3 outputs a press-and-hold signal of the pressure sensor 31 and displacement signals of a first displacement sensor 32, a second displacement sensor 32, and a third displacement sensor 32 to the control chip 2, and the control chip 2 analyzes the signals and then transmits outputted key position information to the display 4 for display.

A control method of a pair of keyboard/mouse gloves is provided, including the following steps:

(1) dividing key positions of a keyboard with a 104-key layout and a mouse into a first key position area, a second key position area, a third key position area, a fourth key position area, and a fifth key position area;

(2) presetting a signal sent by a sensor group of the pair of keyboard/mouse gloves, and setting a single signal or a signal combo outputted by the sensor group respectively in a one-to-one correspondence with key positions in each key position area;

(3) presetting an action of start or stop of the pair of keyboard/mouse gloves and an action of switching to a key position area;

(4) performing a plurality of actions according to the preset action of start or stop of the pair of keyboard/mouse gloves and the preset action of switching to the key position area when a user wears the pair of keyboard/mouse gloves;

(5) analyzing, by a control chip, the action of start or stop and the action of switching performed by the user, and storing and recording an optimal action habit of start or stop and switching;

(6) performing, by the user, an action according to the preset action of switching to the key position area, transmitting, by the sensor group, a signal to the control chip through a data line, transmitting, by the control chip, the signal to a display through the data line, and displaying, by the display, a key position area in which a current response is made; and (7) performing, by the user, an action according to a preset action corresponding to a key position, transmitting, by the sensor group, a signal to the control chip through the data line, transmitting, by the control chip, the signal to the display through the data line, and displaying, by the display, a currently outputted key position.

One of manners of presetting a key position is presented in this embodiment. A finger bends by 170°, that is, a first displacement sensor of a corresponding finger outputs a single signal; a finger bends by 130°, that is, a first displacement sensor and a second displacement sensor of a corresponding finger output a signal combo; a thumb bends by 100°, that is, a first displacement sensor, a second displacement sensor, and a pressure sensor of the thumb output a signal combo, and other four fingers except the thumb bend by 100°, that is, a first displacement sensor, and a second displacement sensor, and a third displacement sensor of each corresponding finger output a signal combo.

The first key position area in step (1) includes F1 to F12 keys, a Delete key, a Ctrl key, a Shift key, an Alt key, a Win key, a Tab key, and an ESC key.

When a right-hand thumb bends by 170°, a key position "F1" is outputted; when a right-hand index finger bends by 170°, a key position "F2" is outputted; when a right-hand middle finger bends by 170°, a key position "F3" is outputted; when a right-hand ring finger bends by 170°, a key position "F4" is outputted; when a right-hand little finger bends by 170°, a key position "F5" is outputted; when a right-hand thumb bends by 130°, a key position "F6" is outputted; when the right-hand index finger bends by 130°, a key position "F7" is outputted; when the right-hand middle finger bends by 130°, a key position "F8" is outputted; when the right-hand ring finger bends by 130°, a key position "F9" is outputted; when the right-hand little finger bends by 130°, a key position "F10" is outputted; when the right-hand index finger bends by 100°, a key position "F11" is outputted; when the right-hand middle finger bends by 100°, a key position "F12" is outputted; when the right-hand ring finger bends by 100°, a key position "Delete" is outputted; when the right-hand little finger bends by 100°, a key position "ESC" is outputted; when a left-hand little finger bends by 170°, a key position "Ctrl" is outputted; when a left-hand ring finger bends by 170°, a key position "Shift" is outputted, when a left-hand middle finger bends by 170°, a key position "Alt" is outputted; when a left-hand index finger bends by 170°, a key position "Win" is outputted; when a left-hand thumb bends by 170°, a key position "Tab" is outputted.

An action of switching to the first key position area is striking a left-hand middle finger. That is, a pressure sensor, a first displacement sensor, a second displacement sensor, and a third displacement sensor that are sleeved on the left-hand middle finger output signals at the same time.

The second key position area includes twenty-six letter keys, a comma key, a period key, and a semicolon key. When the second key position area is switched, if a finger is maintained less than 1s according to a preset input action, a lowercase letter and a subscript symbol are outputted, and if the finger is maintained for more than 1s according to the preset input action, a capital letter and a superscript symbol are outputted.

When the left-hand little finger bends by 170°, a key position "a" is outputted; when the left-hand ring finger bends by 170°, a key position "b" is outputted; when the left-hand middle finger bends by 170°, a key position "c" is outputted; when the left-hand index finger bends by 170°, a key position "d" is outputted; when the left-hand thumb bends by 170°, a key position "e" is outputted; when the right-hand thumb bends by 170°, a key position "f" is outputted; when the right-hand index finger bends by 170°, a key position "g" is outputted; when the right-hand middle finger bends by 170°, a key position "h" is outputted; when the right-hand ring finger bends by 170°, a key position "i" is outputted; when the right-hand little finger bends by 170°, a key position "j" is outputted; when the left-hand little finger bends by 130°, a key position "k" is outputted; when the left-hand ring finger bends by 130°, a key position "l" is outputted; when the left-hand middle finger bends by 130°, a key position "m" is outputted; when the left-hand index finger bends by 130°, a key position "n" is outputted; when the left-hand thumb bends by 130°, a key position "o" is outputted; when the right-hand thumb bends by 130°, a key position "p" is outputted; when the right-hand index finger bends by 130°, a key position "q" is outputted; when the right-hand middle finger bends by 130°, a key position "r" is outputted; when the right-hand ring finger bends by 130°, a key position "s" is outputted; when the right-hand little finger bends by 130°, a key position "t" is outputted; when the left-hand ring finger bends by 100°, a key position "u" is outputted; when the left-hand middle finger bends by 100°, a key position "v" is outputted; when the left-hand index finger bends by 100°, a key position "w" is outputted; when the right-hand index finger bends by 100°, a key position "x" is outputted; when the right-hand middle finger bends by 100°, a key position "y" is outputted; when the right-hand ring finger bends by 100°, a key position "z" is outputted; when the left-hand little finger bends by 100°, a key position "," or "«" is outputted; when the right-hand little finger bends by 100°, a key position "." or "»" is outputted. When the left-hand thumb bends by 100°, a key position ";" or ":" is outputted; when the right-hand thumb bends by 100°, a key position "single quotation mark" or "double quotation mark" is outputted.

An action of switching to the second key position area is striking a left-hand index finger. That is, a pressure sensor, a first displacement sensor, a second displacement sensor, and a third displacement sensor that are sleeved on the left-hand index finger output signals at the same time.

The third key position area includes 0 to 9 number keys that are located above the letter keys and have symbol superscripts, symbol keys, bracket keys, and slash keys. When the third key position area is switched, if a finger is maintained for less than 1s according to a preset input action, a number and a subscript symbol are outputted, and if the finger is maintained for greater than 1s according to the preset input action, a superscript symbol is outputted.

When the left-hand little finger bends by 170°, a key position "1" or "!" is outputted; when the left-hand ring finger bends by 170°, a key position "2" or "@" is outputted; when the left-hand middle finger bends by 170°, a key position "3" or "#" is outputted; when the left-hand index finger bends by 170°, a key position "4" or "$" is outputted; when the left-hand thumb bends by 170°, a key position "5" or "%" is outputted; when the right-hand thumb bends by 170°, a key position "6" or "^" is outputted; when the right-hand index finger bends by 170°, a key position "7" or "&" is outputted; when the right-hand middle finger bends by 170°, a key position "8" or "*" is outputted; when the right-hand ring finger bends by 170°, a key position "9" or "(" is outputted; when the right-hand little finger bends by 170°, a key position "0" or ")" is outputted; when the left-hand little finger bends by 130°, a key position "`" or "~" is outputted; when the left-hand ring finger bends by 130°, a key position "[" or "{" is outputted; when the left hand middle finger bends by 130°, a key position "]" or "}" is outputted; when the left-hand index finger bends by 130°, a key position "-" or "_" is outputted; when the left-hand thumb bends by 130°, a key position "=" or "+" is outputted; when the right-hand thumb bends by 130°, a key position "\" or "|" is outputted.

An action of switching to the third key position area is striking the left-hand index finger twice within 1s. That is, a pressure sensor, a first displacement sensor, a second displacement sensor, and a third displacement sensor that are sleeved on the left-hand index finger output signals twice at the same time.

The fourth key position area includes direction keys and function keys located above the direction keys.

When the left-hand little finger bends by 170°, a key position "Print" is outputted; when the left-hand ring finger bends by 170°, a key position "ScrollLock" is outputted; when the left-hand middle finger bends by 170°, a key position "Pause" is outputted; when the left-hand index finger bends by 170°, a key position "ScreebSysRq" is outputted; when the left-hand thumb bends by 170°, a key position "Break" is outputted; when the right-hand thumb bends by 170°, a key position "Insert" is outputted; when the right-hand index finger bends by 170°, a key position "Home" is outputted; when the right-hand middle finger bends by 170°, a key position "End" is outputted; when the right-hand ring finger bends by 170°, a key position "Page UP" is outputted; when the right-hand little finger bends by 170°, a key position "Page Down" is outputted; when the right-hand thumb bends by 130°, a key position "↑" is outputted; when the right-hand index finger bends by 130°, a key position "↓" is output; when the right-hand middle finger bends by 130°, a key position "←" is outputted; when the right-hand ring finger bends by 130°, a key position "→" is outputted.

An action of switching to the fourth key position area is striking a right-hand middle finger. That is, a pressure sensor, a first displacement sensor, a second displacement sensor, and a third displacement sensor that are sleeved on the right-hand middle finger output signals at the same time.

The fifth key position area includes a left key, a right key and a wheel of the mouse.

When the right-hand index finger clicks a desktop, that is, a pressure sensor at a fingertip of the right-hand index finger outputs a signal, a response is made to a function of the left key of the mouse.

When the right-hand middle finger clicks the desktop, that is, a pressure sensor at a fingertip of the right-hand middle finger outputs a signal, a response is made to a function of clicking a wheel key of the mouse; when the right-hand middle finger bends, a response is made to a function of sliding the wheel key of the mouse;

When the right-hand ring finger clicks the desktop, that is, a pressure sensor at a fingertip of the right-hand ring finger outputs a signal, a response is made to a function of the right key of the mouse.

An action of switching to the fifth key position area is sliding of four fingers except the thumb of the left hand. That is, pressure sensors, first displacement sensors, second displacement sensors, and third displacement sensors that are sleeved on the four fingers except the thumb of the left hand output signals at the same time.

The optimal action habit of start or stop and switching in step (5) includes: summarizing, by the control chip according to a plurality of actions of start or stop and switching performed by the current user, a habitual action of start or stop and switching performed by the user, and defining the habitual action as the optimal action habit of start or stop and switching.

The control chip of the pair of keyboard/mouse gloves receives the signal outputted by the sensor group, and if it is detected that a single character is inputted for a plurality of times or for a long time, the control chip transmits the signal to the display through the data line, and the display displays an input error warning.

The user performs custom settings on the action of start or stop of the pair of keyboard/mouse gloves, the action of switching to the key area, an input of the key, and a combination key according to operating habits of the user. For example, a key position area of a combination key is added, where an action of switching to the key position area of the combination key is striking the right-hand index finger. That is, a pressure sensor, a first displacement sensor, a second displacement sensor, and a third displacement sensor of the right-hand index finger make responses at the same time.

A corresponding action of inputting a combination key: when a force is applied to a fingertip of the right-hand thumb twice consecutively within is, that is, a pressure sensor at the fingertip of the right-hand thumb outputs signals twice within is, outputting a key position "Ctrl+A".

When the fingertip of the right-hand index finger, that is, the pressure sensor at the fingertip of the right-hand index finger outputs a signal, a key position "Ctrl+C" is outputted.

When the fingertip of the right-hand middle finger, that is, the pressure sensor at the fingertip of the right-hand middle finger outputs a signal, a key position "Ctrl+V" is outputted.

As described above, the pair of keyboard/mouse gloves provided in the present disclosure can implement input flexibility of the pair of keyboard/mouse gloves, and to adapt to input habits of people in different fields, a customized key position setting is provided, so that various requirements of users in various industries can be met.

The above is merely preferred embodiments of the present disclosure, and all equivalent changes and modifications made according to the scope of the claims of the present disclosure shall fall within the scope covered in the claims of the present disclosure.

The invention claimed is:

1. A pair of keyboard/mouse gloves, comprising a left-handed keyboard/mouse glove and a right-handed keyboard/mouse glove that are matched for use and have a same structure, wherein the pair of keyboard/mouse gloves comprise a glove body, a control chip, a plurality of sensor groups, and a display;
the sensor group comprises a pressure sensor and at least two displacement sensor groups, wherein the sensor group is disposed inside the glove body and located at each finger, the pressure sensor is disposed at a fingertip of each finger, the displacement sensor group is disposed at a joint of each finger, the pressure sensor and the displacement sensor group, two displacement sensor groups, and two adjacent sensor groups are respectively connected to each other through a data communication line, and the plurality of sensor groups are connected to the control chip after being connected to each other;
the displacement sensor group comprises an arch-shaped elastic ring, a silicone ring, and four displacement sensors, wherein the four displacement sensors are equidistantly, circumferentially and evenly distributed on an outer wall of the arch-shaped elastic ring, two adjacent displacement sensors are connected to each other through the data communication line, and after the displacement sensors are mounted on the outer wall of the arch-shaped elastic ring, the silicone ring is sleeved on the outer wall of the arch-shaped elastic ring; and
both the control chip and the display are mounted at a palm back of the glove body, and the control chip receives a signal sent by the sensor group for key position analysis, and transmits analyzed key position information to the display for display.

2. The pair of keyboard/mouse gloves according to claim 1, wherein a sensor group sleeved on a thumb comprises a pressure sensor disposed at a fingertip, a second displacement sensor group sleeved on an interphalangeal joint, and a first displacement sensor group sleeved on a metacarpophalangeal joint;
a sensor group sleeved on a remaining finger comprises a pressure sensor disposed at a fingertip, a third displacement sensor group sleeved on a distal interphalangeal joint (DIPJ), a second displacement sensor group sleeved on a proximal interphalangeal joint (PIPJ), and a first displacement sensor group sleeved on a metacarpophalangeal joint; and
the sensor group outputs a press-and-hold signal of the pressure sensor and displacement signals of a first displacement sensor, a second displacement sensor, and a third displacement sensor to the control chip, and the control chip analyzes the signals and then transmits outputted key position information to the display for display.

3. The pair of keyboard/mouse gloves according to claim 1, wherein a plurality of air holes are uniformly disposed on the glove body, a detachable sheet body is disposed at a palm center of the glove body, and a detachable finger sleeve is disposed at a fingertip of the glove body.

4. A control method of a pair of keyboard/mouse gloves, wherein the method comprises the following steps:
(1) dividing key positions of a keyboard with a 104-key layout and a mouse into a first key position area, a second key position area, a third key position area, a fourth key position area, and a fifth key position area;
(2) presetting a signal sent by a sensor group of the pair of keyboard/mouse gloves, and setting a single signal or a signal combo outputted by the sensor group respectively in a one-to-one correspondence with key positions in each key position area;
(3) presetting an action of start or stop of the pair of keyboard/mouse gloves and an action of switching to a key position area;
(4) performing a plurality of actions according to the preset action of start or stop of the pair of keyboard/mouse gloves and the preset action of switching to the key position area when a user wears the pair of keyboard/mouse gloves;
(5) analyzing, by a control chip, the action of start or stop and the action of switching performed by the user, and storing and recording an optimal action habit of start or stop and switching;
(6) performing, by the user, an action according to the preset action of switching to the key position area, transmitting, by the sensor group, a signal to the control chip through a data line, transmitting, by the control chip, the signal to a display through the data line, and displaying, by the display, a key position area in which a current response is made; and (7) performing, by the user, an action according to a preset action corresponding to a key position, transmitting, by the sensor group, a signal to the control chip through the data line, transmitting, by the control chip, the signal to the display through the data line, and displaying, by the display, a currently outputted key position.

5. The control method of a pair of keyboard/mouse gloves according to claim 4, wherein the first key position area in step (1) comprises F1 to F12 keys, a Delete key, a Ctrl key, a Shift key, an Alt key, a Win key, a Tab key, and an ESC key;

the second key position area comprises twenty-six letter keys, a comma key, a period key, and a semicolon key;

the third key position area comprises 0 to 9 number keys that are located above the letter keys and have symbol superscripts, symbol keys, bracket keys, and slash keys;

the fourth key position area comprises direction keys and function keys located above the direction keys; and the fifth key position area comprises a left key, a right key and a wheel of the mouse.

6. The control method of a pair of keyboard/mouse gloves according to claim 5, wherein if fingers in the second key position area and the third key position area are maintained for less than is according to a preset action, it indicates that a lowercase letter, a subscript number, or a subscript symbol is input; and if the fingers are maintained for more than is according to the preset action, it indicates that a capital letter or a superscript symbol is input.

7. The control method of a pair of keyboard/mouse gloves according to claim 4, wherein the preset action of start of the pair of keyboard/mouse gloves is an action of bending other eight fingers except thumbs of both hands and striking a plane;

the preset action of stop of the pair of keyboard/mouse gloves is an action of folding and flatly laying ten fingers of both hands;

an action of switching to the first key position area is striking a left-hand middle finger;

an action of switching to the second key position area is striking a left-hand index finger;

an action of switching to the third key position area is striking the left-hand index finger twice within 1 s;

an action of switching to the fourth key position area is striking a right-hand middle finger; and an action of switching to the fifth key position area is sliding of four fingers except the thumb of the left hand.

8. The control method of a pair of keyboard/mouse gloves according to claim 4, wherein the optimal action habit of start or stop and switching in step (5) comprises: summarizing, by the control chip according to a plurality of actions of start or stop and switching performed by the current user, a habitual action of start or stop and switching performed by the user, and defining the habitual action as the optimal action habit of start or stop and switching.

9. The control method of a pair of keyboard/mouse gloves according to claim 4, wherein the control chip of the pair of keyboard/mouse gloves receives the signal outputted by the sensor group, and if it is detected that a single character is inputted for a plurality of times or for a long time, the control chip transmits the signal to the display through the data line, and the display displays an input error warning.

10. The control method of a pair of keyboard/mouse gloves according to claim 4, wherein the user performs custom settings on the action of start or stop of the pair of keyboard/mouse gloves, the action of switching to the key area, an input to the key position, and a combination key according to operating habits of the user.

* * * * *